United States Patent [19]

Mounce

[11] 4,163,966

[45] Aug. 7, 1979

[54] RODENT REPELLOR

[76] Inventor: George R. Mounce, 18 Bridle Path, Willowdale, Ontario, Canada, M2L 1C8

[21] Appl. No.: 893,475

[22] Filed: Apr. 4, 1978

[51] Int. Cl.² .......................................... H04B 11/00
[52] U.S. Cl. ........................................ 340/15; 43/124
[58] Field of Search ................ 340/15, 384 E; 43/124; 116/22 A

[56] References Cited

U.S. PATENT DOCUMENTS

| 3,873,960 | 3/1975 | Gates, Sr. | 340/15 |
| 3,879,702 | 4/1975 | Mancone | 340/15 |

Primary Examiner—Theodore M. Blum
Attorney, Agent, or Firm—Fetherstonhaugh & Co.

[57] ABSTRACT

A vibratory pest control device having a sonic resonator with more than one mode of vibration and a driving element coupled to the resonator to vibrate it alternately at different frequencies.

8 Claims, 6 Drawing Figures

RODENT REPELLOR

This invention relates to a vibratory device for the purpose of pest control.

It is well established that pests, such as rodents, react negatively to high sound levels to such an extent that they will not go into an area where a high sound level exists even when the area contains food. Devices already exist for controlling pest behaviour by radiating sonic energy at higher frequencies where the pest hears well but where human reaction to the sound is negligible.

The commonly used ones of these devices emit sound of one frequency. Some of them emit intermittently because it has been found that an intermittent sound of one frequency is more effective than a continuous sound of one frequency.

This invention provides for the emission of sound at two or more frequencies sequentially so that the disturbing sonic field of different frequencies is present continuously. It has been found that such a sonic field can be efficiently produced with a single sonic resonator that has a plurality of modes of vibration within the sound range to which the pests are sensitive and driving the resonator electronically at different ones of its modes of vibration.

Because of the poor coupling of a vibrating element to air, considerable amplitude of the vibrating member is required to radiate appreciable sonic energy. At supersonic frequencies such amplitudes are difficult and expensive to obtain unless the radiator is resonant at the required frequency. It has been found possible to design a resonator of practical size with a series of resonant frequencies, i.e., modes of vibration within the frequency range suitable for pest control and to drive the resonator alternately at two or more of its modes of vibration.

It is an object of this invention to provide a vibratory device for generating sonic energy at a frequency adapted for the purpose of pest control that is effective and efficient.

A vibratory device for generating sonic energy at a frequency adapted for the purpose of pest control comprises a sonic resonator having a plurality of modes of vibration each at a frequency suitable for pest control; a driving element coupled to said resonator to vibrate said resonator to radiate sonic energy; an oscillatory electronic circuit including a drive amplifier; said driving element, means for providing a feedback signal to said drive amplifier which is a function of the amplitude of vibration of said resonator, a plurality of frequency-selective means, each capable of controlling the gain vs frequency response of said electronic circuit to the frequency of a different mode of vibration of said resonator and switching means for connecting said frequency-selective means one at a time into said electronic circuit; said driving element being in the output of said drive amplifier and said drive amplifier having a power gain sufficient to maintain the resonator in vibrating condition for pest control.

The resonator used with the embodiment of the invention illustrated is a metallic disc of aluminum that has an area and stiffness such that it has more than one mode of vibration within the range to which the pests that are to be discouraged are sensitive. Rodents are usually sentive to frequencies within the range of 20,000 Hertz to 40,000 Hertz.

Figure 1:
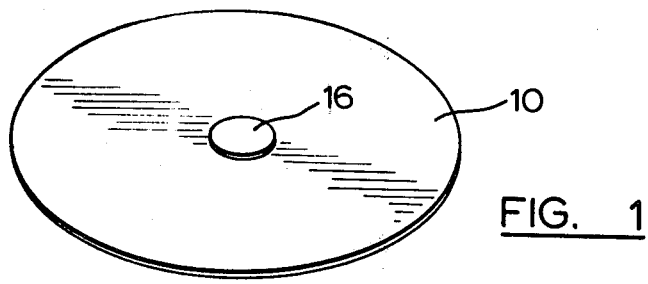
FIG. 1 is an illustration of a vibratory pest control device according to the invention.
Figure 2:
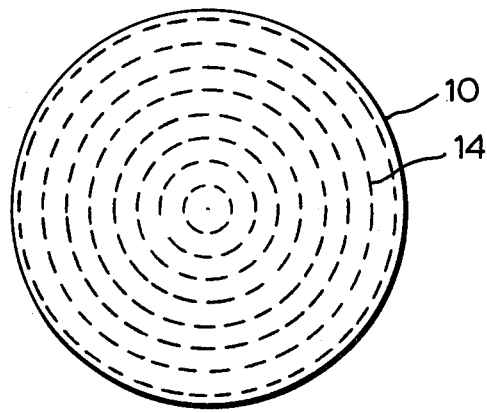
FIG. 2 is a view of the resonator of the device of FIG. 1 showing the nodes for one mode of vibration.
Figure 3:
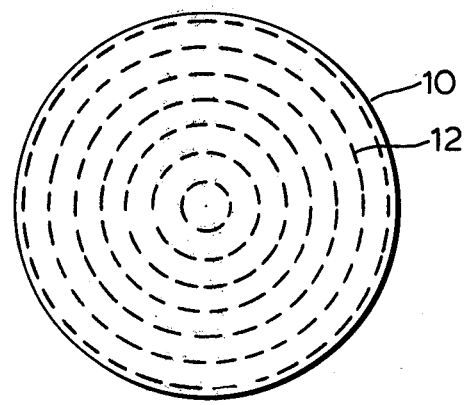
FIG. 3 is a view of the same resonator as FIG. 2, but showing the nodes for another mode of vibration.

The disc 10 illustrated in FIG. 1 of the drawings is made of aluminum supplied by Kaiser Aluminum Company and of its specification 5052-H34-A-25018. It has a diameter of 5.89 inches and a thickness of 0.042 inches and resonates at about 22,420 Hertz with 7 nodal rings and at about 29,200 Hertz with 8 nodal rings. FIGS. 2 and 3 of the drawings illustrate the nodal rings 12 for the 7 ring mode of vibration and the nodal rings 14 for the 8 ring mode of vibration.

In use a piezoelectric element 16 is mounted at the centre of the disc 10 by means of an electricity conducting cement and the unit is connected into a circuit as will be explained later by making an electrical connection to one side of the piezoelectric element and the disc.

The piezoelectric element 16 in use is caused to vibrate alternatively at a frequency that will vibrate the disc at its mode of vibration that has 7 nodal rings and its mode of vibration that has 8 nodal rings. The result is that the disc radiates sonic energy at a frequency depending upon the mode of vibration at which the disc driving element vibrates from time to time.

The concept of driving a disc with a piezoelectric element to cause the disc to radiate sonic energy is not broadly new but it is important that in this invention the piezoelectric element is caused to alternatively vibrate at two frequencies that correspond to two modes of vibration of the disc so that the disc will alternatively radiate sonic energy at two different frequencies.

The resonant frequencies or modes of vibration of the disc 10 are quite sharp and the driving frequency of the driving element 16 must be very close to the resonant frequency for efficient excitation of the disc. One manner of achieving this efficient excitation of the disc is to permit the vibration of the disc itself to determine the driving frequency. This can be achieved by an electronic circuit including an amplifier that has a gain sufficient to maintain the resonator in vibrating condition for pest control and that has a feedback signal that controls frequency of vibration that is essentially due to the component of the driving element current that is caused by the disc absorbing energy at resonance. When the applied frequency is not close to a resonant frequency of the disc very little energy is absorbed from the driving element. The piezoelectric driving element under such circumstances acts like a capacitor and the current through it is small and at near 90° in phase with the applied voltage. At resonance after nulling for a mode of vibration of the disc, appreciable energy is supplied by the piezoelectric element, resulting in an in-phase component of the current through the piezoelectric element of considerably greater magnitude than the capacitive current of the nonresonant state. By employing a means for balancing the effect of the capacitive current through the piezoelectric element at nonresonance and feeding back a signal that is caused by the increase in the resistive component of current in the piezoelectric element at resonance of the disc to use as a feedback to the drive amplifier to control oscillation one can drive the amplifier at a resonant frequency of the disc. Thus, the input signal to the amplifier is a function of the vibration of the resonator.

Figure 4:
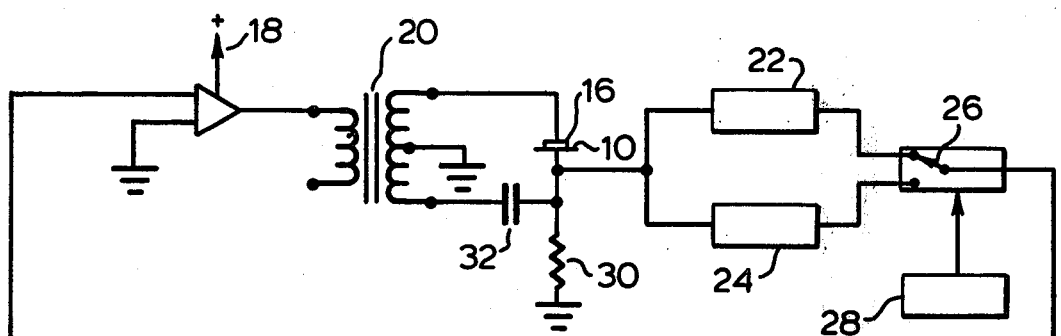
FIG. 4 is an illustration of an electronic circuit for a pest control device.

A typical electronic circuit for vibrating the disc precisely at a mode of vibration is illustrated in FIG. 4. The piezoelectric element is indicated by the numeral 16. Numeral 18 refers to the drive amplifier, the power output of which is applied to the piezoelectric crystal 16 through the transformer 20 to supply the sonic energy. The power circuit is completed through one or other of the two filter elements 22 and 24 depending upon the position of the switch 26. Switch 26 is actuated from the position illustrated in FIG. 4 where filter 22 is connected into the circuit to the other position where filter 24 is connected into the circuit by the timer 28.

Filter 22 is adapted to pass a band of frequencies near the frequency that corresponds to the 29,200 Hertz 8 nodal ring mode of vibration of the disc illustrated in FIG. 2 of the drawings and filter 24 is designed to pass a band of frequencies close to the 22,420 Hertz seven nodal frequency of the mode of vibration of the disc illustrated in FIG. 3 of the drawings.

A feedback signal to the amplifier is taken across resistor 30. This feedback signal is essentially due to the component of the piezoelectric element current that is caused by the disc absorbing energy at resonance and will maintain the frequency of oscillation of the electronic circuit at the mode of vibration of the vibrator disc for the particular filter element selected.

In this latter connection when the applied frequency to the piezoelectric element 32 is not close to a resonant frequency of the disc to which the element is attached very little energy is absorbed from the piezoelectric element. The element under such circumstances acts like a capacitor and its current is at near 90° in phase with the applied voltage. At resonance after nulling for a mode of vibration of the disc, however, appreciable energy is supplied by the piezoelectric element resulting in an in-phase component of the current through the piezoelectric element of considerably greater amplitude than the capacitive current of the nonresonant state. Capacitor 32 is designed to have a similar capacitance to the piezoelectric element 16 so that the capacitive component of current through the piezoelectric element is cancelled by the capacitive current through the capacitor 32, fed by the opposite phase output of driving transformer 20. The result is that the voltage developed across the resistor 30 is essentially due to the increase in current through the piezoelectric element 16 as a resonant frequency of the disc is approached and it will automatically maximize under conditions of oscillation.

Figure 5:
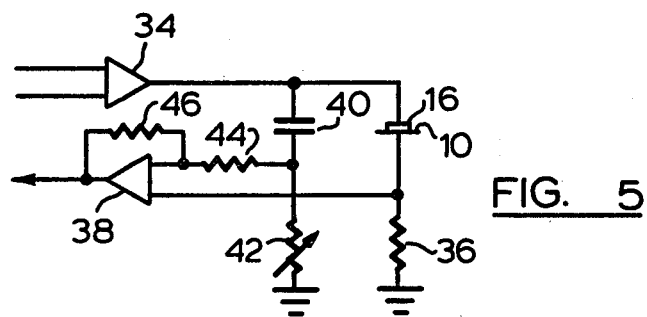
FIG. 5 illustrates an alternative method for achieving feedback to the amplifier of the pest control device.

An alternative manner of producing a feedback signal is illustrated in FIG. 5. In this case, the drive for the piezoelectric element 16 is taken directly from the drive amplifier 34 and the resulting current through the piezoelectric element produces a voltage across load resistor 36. This voltage is applied to the noninverting input of operational amplifier 38. Capacitor 40 is also connected to the output of drive amplifier 34 and the current flowing through it produces a voltage across variable load resistor 42. This signal is applied to the inverting input of amplifier 24 through resistor 44. In order to have the voltage across the load resistor 42 essentially 90° from the output voltage of the drive amplifier 34 its resistance value must be small compared to the reactance of capacitor 40. Feedback resistor 46 determines the gain of operational amplifier 38. With variable load resistor 42 properly adjusted the signal due to the capactive current through capacitor 40 applied to the inverting input of operational amplifier 38 just balances out, at the output of operational amplifier 38, the signal developed across resistor 25 due to the capacitive current through piezoelectric element 21 when the applied frequency is not at a resonant frequency of the transducer disc. The result is an output signal from the operational amplifier 38 which is essentially due to the increase in current through piezoelectric element 21 when a resonant frequency of the transducer disc is approached.

Other methods of maintaining the oscillator at the frequency of a mode of vibration will be apparent to those skilled in the art (one is described in U.S. Pat. No. 3,879,702) and, while the methods herein described are important, it is not intended to limit the invention in its broadest aspect to them.

Other means for providing a feedback signal which is a function of the vibration of the disc will be apparent to those skilled in the art and the means of maintaining vibration of the piezoelectric element at a mode of vibration of the disc is not of itself essential to the invention. Other arrangements for producing a signal for controlling the drive frequency are within the contemplation of the invention.

Figure 6:
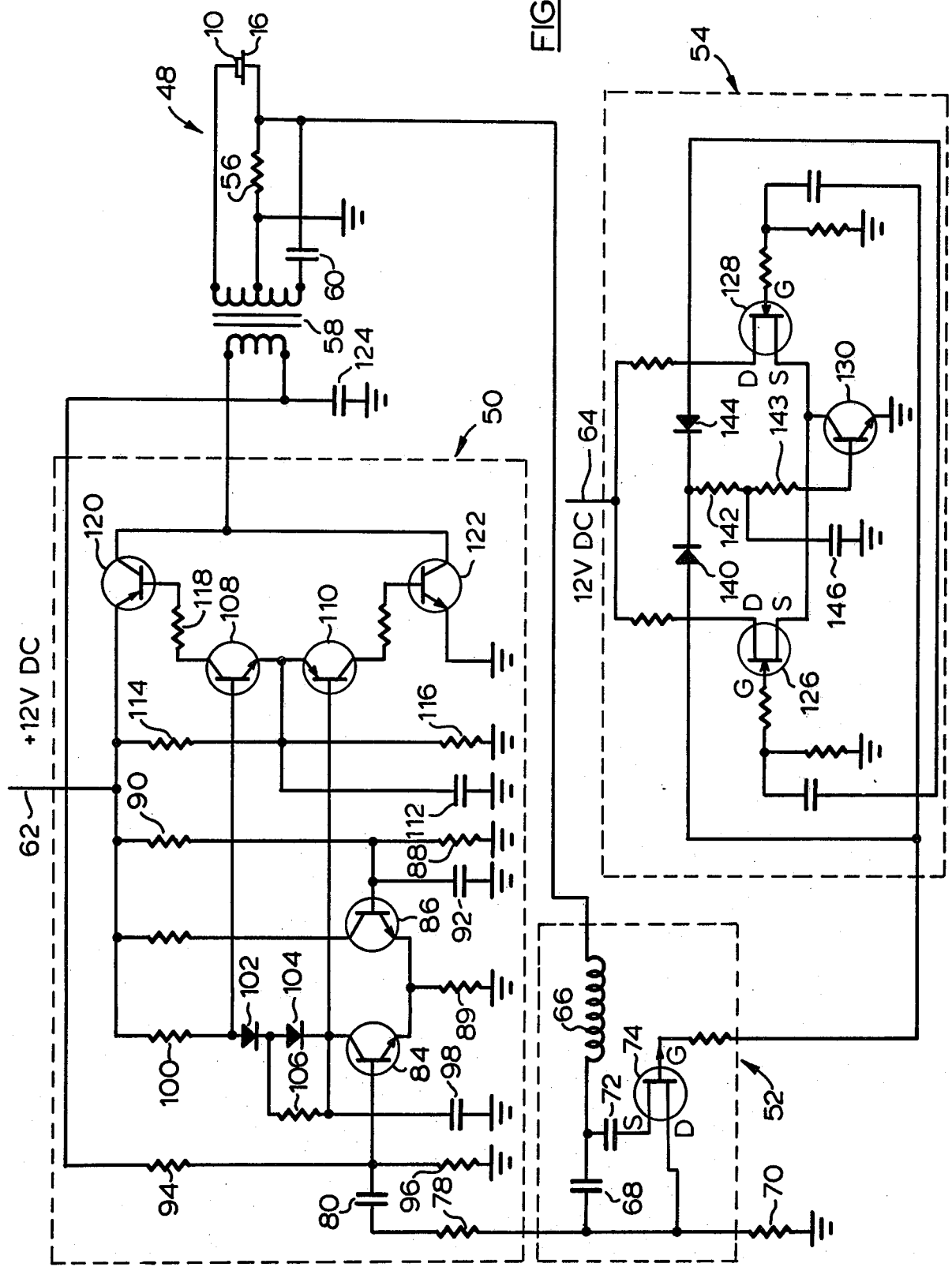
FIG. 6 is a more detailed circuit illustration for the device according to the invention.

FIG. 6 is a more detailed illustration of a circuit arrangement for the invention. In this drawing the principal parts of the device have been indicated by blocks and they comprise the sonic resonator and its associated means for providing a feedback signal to the drive amplifier generally indicated by the numeral 48. The drive amplifier generally indicated by the numeral 50, the frequency selecting filters generally indicated by the numeral 52, and the timer for switching the frequency determining filters into the circuit on an alternative basis generally indicated by the numeral 54.

In this case the piezoelectric element 10 and the disc 16 are indicated as before. The element 10 is cemented with conducting cement to the centre of the radiating disc 16 and as before explained the electrical characteristics of the combination considering the input connections to one side of the piezoelectric element 10 as one connection of the input and the metal disc as the other appear as a high impedance essentially capacitive in nature when the input frequency is not that at which one of the modes of vibration of the disc 16 is excited, but change to a much lower impedance when the frequency approaches one of the modes of vibration of the disc 16. As explained above the lowering of the impedance of the piezoelectric element 10 at a resonant frequency of the disc results from the power absorbed by the disc at a mode of vibration. Part of the energy absorbed is due to the supersonic sound energy radiated from the disc 16.

It will be noted that in FIG. 6 resistor 56 is in series with piezoelectric element 10 and that the combination is driven from one half of the secondary winding of transformer 58. As described above current through the piezoelectric element 10 can be considered as being composed of two components; a capacitive component due to the capacitance of the piezoelectric element and its associated disc and a resistive component due to the energy absorbed from the piezoelectric element by the disc as it vibrates.

The object of the device is to drive the disc 16 at one of its resonant frequencies and the resistive component of the current is indicative of resonance. The capacitive component of the current is an undersirable signal and is cancelled out by the current through capacitor 60 which is connected from the opposite phase of the secondary winding of transformer 58 to that which is connected to the piezoelectric element 10 and the junction of resistor 56 and the connection to the piezoelectric element through the disc. If the centre tapped output winding of the transformer 58 is balanced and capacitor 60 is equal in value to the capacity of piezoelectric element 10 and its associated disc, the signal developed across the resistor 56 will be essentially zero when the driving frequency from the transformer 58 does not correspond to a mode of vibration of the disc, but will increase to a maximum at the resonance point of the disc. It will be understood that balance can be achieved for other voltage distributions across the transformer by choice of capacitor 32. The phase of the signal developed across resistor 56 will be essentially the same as that of the driving voltage across the secondary of transformer 58.

In the embodiment of the invention illustrated in FIG. 6 two modes of vibration of the disc are used alternatively and their selection is controlled by the filter 52 and the timer 54. Power, in this particular case 12 volts DC, is applied to the amplifier as at 62 and to the timer as at 64.

It will be noted that the signal across resistor 56 is applied to the filter unit 52. The filter unit comprises an inductance coil 66, a capacitor 68, a resistor 70, a capacitor 72 and a transistor 74. The timer 54 connects with the gate of the transistor 74 of the filter to permit the filter to pass the high frequency or the low frequency as required to select one or other of the modes of vibration of the disc.

The higher pass frequency of the filter assembly is achieved with inductor 66 and capacitor 68 in series resonance. This is achieved when transistor 74 is nonconducting. Under this arrangement a low impedance essentially resistive in nature is connected between resistor 56 and resistor 70. Under these conditions the signal across resistor 56 also appears across resistor 70 with little attenuation. However, at frequencies appreciably away from resonance the series impedance presented by the inductor 66 and capacitor 68 is high compared with the value of resistor 70 and the signal from resistor 56 is greatly attenuated. If, now, the resonant frequency of inductor 66 and capacitor 72 corresponds to a frequency of one of the modes of vibration of the disc 16, the feedback to the input of the amplifier driving the piezoelectric element will favour that mode above all others and the system will oscillate at that frequency to the exclusion of all others provided there is sufficient gain around the loop.

The lower pass frequency of the filter is achieved by rendering transistor 74 conducting by applying the control signal to its gate. The filter unit now comprises inductor 66 in series with parallel capacitors 68 and 72. The resonant frequency of this arrangement is made to coincide with the frequency of the low frequency mode of operation of the disc 16 so that the system will oscillate at this second frequency to the exclusion of all others.

Thus, by alternatively rendering conducting and then nonconducting the transistor 74 by means of application of a control signal to its gate, two modes of vibration of the disc 16 are alternatively selected and energy is radiated by the disc at these two frequencies.

The two modes of vibration selected in the embodiment of the invention illustrated were without intervening modes, i.e., the disc was about 6 inches in diameter as described above and the high mode of vibration was in the order of 29 kilohertz and the low mode of vibration was in the order of 22 kilohertz.

The signal developed across resistor 70 in the manner just described is applied through resistor 78 and capacitor 80 to the base of NPN transistor 84. Transistor 84 and transistor 86 comprise a differential amplifier input stage with resistor 89 being the common emitter resistor. Bias conditions are set by the voltage applied to the base of transistor 86 from a divider from the plus supply to ground composed of resistor 88 and resistor 90. Since this voltage sets the dc conditions only, the base of transistor 86 is bypassed with capacitor 92. The other differential input has the ac signal applied through resistor 78 and capacitor 80, as previously described, with the dc level set on the base of transistor 84 by divider comprising resistor 94 and resistor 96. The input to the divider to the top end of resistor 94 comes from capacitor 98 in series with the primary transformer 58 at the output of the amplifier. The manner in which this part of the circuit functions will be later described.

The output from the differential input stage is taken from the collector circuit of transistor 84. The collector load consists of resistor 100 in series with diode 102 which, in turn, is in series with diode 104. Diode 104 is in parallel with resistor 106. The polarity of the diodes is such that current flows in the conducting direction to the collector of transistor 84. It will be noted that the anode of diode 102 connects to the base of transistor 108 and the cathode of diode 104 connects to the base of transistor 110. The two diodes would normally have a voltage drop across them equal to the two threshold voltages of transistor 108 and transistor 110. In order to avoid excessive current through these two transistors, the voltage drop across the two diodes is slightly reduced by resistor 106 across diode 104. Considering the ac signals to the the base of transistor 108 and transistor 110, due to the relatively constant voltage drop across diode 102 and diode 104 these two ac signals will have essentially the same amplitude and the dc level will be apart by approximately 1.4 V., the amount of two transistor threshold voltages. The emitter circuit of transistor 108 and transistor 110 consists essentially of capacitor 112. The divider from the supply voltage to ground comprising resistor 114 and resistor 116 applies a voltage to the emitter circuit equal to half the supply voltage but the action of this divider is only significant in setting initial bias conditions prior to oscillation in the system. Capacitor 112 receives current from the emitter of transistor 108 and provides current to the emitter of transistor 110. The potential at the two emitters will be at the level where these two currents exactly balance.

The gain of the amplifier is such that transistor 108 is rendered fully conducting on the positive swing of the signal from the collector circuit of transistor 84 while transistor 110 is cut off. The reverse is true on the negative swing of the signal from transistor 84, i.e., transistor 110 is fully conducting and transistor 108 is cut off.

The collector current of transistor 108 is drawn through current-limiting resistor 118 from the base of output PNP transistor 120. When transistor 108 is conducting, transistor 120 is fully turned on. The same conditions exist for the combination of PNP transistor 110 and NPN transistor 122. When transistor 110 is conducting, transistor 122 is fully turned on. Transistor 120 and transistor 122 are of a type with a low emitter to collector voltage when fully conducting. The small voltage drop across these transistors results in little heating and, therefore, high efficiency. It is important that the amplifier dissipate as little heat as possible because of the problem of getting rid of the heat in a sealed container necessary for outdoor operation.

Capacitor 98 is the dc blocking capacitor in series with the primary of transformer 58. It will assume a potential such that the current provided by transistor 120 is equal to the current drained by transistor 122. This condition is apparent when it is realized that transistor 122 is cut off when transistor 120 is conducting. The optimum condition exists when the dc bias conditions throughout the amplifier are such that the potential across capacitor 124 is mid-way between the supply voltage and ground. To insure that this condition is met, the voltage across capacitor 124 is applied to the top end of a divider consisting of resistor 94 and 96. The output of this divider is applied to the base of transistor 84. It will be recalled that this base is one differential input to the amplifier with the other input derived from a divider in the base circuit of transistor 86. These two dividers are so proportioned that the dc level is equal at the base of transistor 84 and transistor 86 when the voltage across capacitor 124 is one-half the supply voltage. The action is thus to provide negative dc feedback to maintain proper bias levels throughout the amplifier.

The oscillatory loop consists of the signal output from the output transformer causing current to flow through the piezoelectric element at a resonant point for the transducer disc which causes a signal to be developed across series resistor 56 which appears across terminating resistor 70, provided that the filter comprising inductor 66 and either capacitor 68 or capacitor 68 in parallel with capacitor 74 is resonant at the frequency of a mode of vibration of the transducer disc 16, and the voltage across resistor 70 is applied to the input of the amplifier which, in turn, provides the drive for the piezoelectric element to complete the loop. The phase of the amplifier and output transformer combination is such as to provide positive feedback.

The control signal which is applied to the gate of transistor 74 to determine which of the two resonant frequencies of the filter are selected at a particular time is derived from a multivibrator timer circuit comprises of transistor 126 and transistor 128 and their associated circuitry. Transistor 126 is alternatively conducting and cut off, resulting in a squarewave signal to the base of transistor 74 which alternatively renders it conducting and then cut off. The period of conduction is normally equal to the period of nonconduction with each being about a second in duration. In order to obtain a multivibrator frequency in the two-second range, fet-type transistors are used to avoid the use of very high values of coupling capacitors, as would be necessary with NPN transistors due to the base current which must be provided this type of device. The only unusual feature of the multivibrator is the special circuit to insure that it oscillates. In a conventional multivibrator using fet transistors it is possible for both transistors to be bottomed (fully conducting) and the circuit locked up. This condition is prevented in this circuit by transistor 130, a conventional NPN transistor, in series with the source of transistor 126 and transistor 128. When transistor 126 is cut off its drain voltage is high which provides base current to transistor 138 through diode 140 and resistor 142 in series with resistor 143. When transistor 128 is cut off, base current to transistor 130 is provided through diode 144 to the same two resistors. Capacitor 146 provides storage to insure a continuing supply of base current during transition of conduction from one fet to the other. It is obvious that both transistors of the multivibrator cannot conduct simultaneously since that would mean both drains were low and there would be no source of base current for transistor 138 which would cease to conduct thereby turning off both multivibrator transistors.

It is not intended that the invention be restricted to the specific embodiments herein described.

What I claim as my invention is:

1. A vibratory device for generating sonic energy at a frequency adapted for the purpose of pest control comprising:

a sonic resonator having a plurality of modes of vibration each at a frequency suitable for pest control;

a driving element coupled to said resonator to vibrate said resonator to radiate sonic energy;

an oscillatory electronic circuit including a drive amplifier, said driving element, means for providing a feedback signal to said drive amplifier which is a function of the amplitude of vibration of said resonator, a plurality of frequency-selective means, each capable of controlling the gain vs frequency response of said electronic circuit to the frequency of a different mode of vibration of said resonator and switching means for connecting said frequency-selective means one at a time into said electronic circuit;

said driving element being in the output of said drive amplifier and said drive amplifier having a power gain sufficient to maintain the resonator in vibrating condition for pest control.

2. A vibratory device for generating sonic energy at a frequency adapted for the purpose of pest control as claimed in claim 1 in which said driving element is piezoelectric element of significant capacitance; said means for providing a feedback signal to said amplifier including capacitor means for balancing out the capacitive effect of the piezoelectric device and deriving a feedback signal that is proportional to the magnitude of the resistive component of current through the piezoelectric element.

3. A vibrating device for generating sonic energy at a frequency adapted for the purpose of pest control as claimed in claim 2 in which said sonic resonator is a disc.

4. A vibrating device for generating sonic energy at a frequency adapted for the purpose of pest control as claimed in claim 1 in which said sonic resonator is a disc.

5. A vibratory device for generating sonic energy at a frequency adapted for the purpose of pest control as claimed in claim 1 in which said means for providing a feedback signal to said amplifier including capacitor means for balancing out the capacitive effect of the piezoelectric device and deriving a feedback signal that is proportional to the magnitude of the resistive component of current through the piezoelectric element.

6. A vibratory device for generating sonic energy at a frequency adapted for the purpose of pest control as claimed in claim 1 in which said driving element is piezoelectric element of significant capacitance.

7. A vibrating device for generating sonic energy at a frequency adapted for the purpose of pest control as claimed in claim 5 in which said sonic resonator is a disc.

8. A vibrating device for generating sonic energy at a frequency adapted for the purpose of pest control as claimed in claim 6 in which said sonic resonator is a disc.

* * * * *